E. J. LEYBURN.
Device for Handling and Setting Stone.
No. 216,334. Patented June 10, 1879.
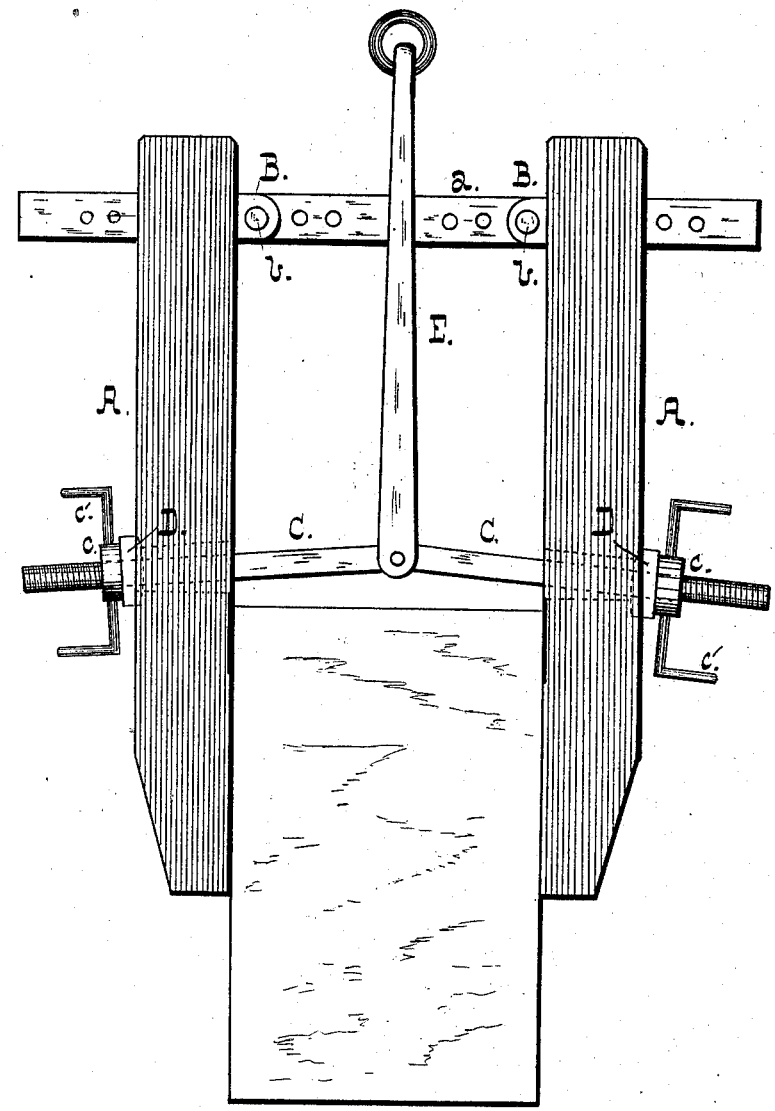

UNITED STATES PATENT OFFICE.

EDWARD J. LEYBURN, OF LEXINGTON, VIRGINIA, ASSIGNOR TO HENRY O. STEBBINS, OF WASHINGTON, DISTRICT OF COLUMBIA, AND CHARLES NEILSON, OF NEW YORK, N. Y., ONE-FOURTH TO EACH.

IMPROVEMENT IN DEVICES FOR HANDLING AND SETTING STONE.

Specification forming part of Letters Patent No. 216,334, dated June 10, 1879; application filed April 29, 1879.

*To all whom it may concern:*

Be it known that I, EDWARD J. LEYBURN, of Lexington, Rockbridge county, State of Virginia, have invented certain new and useful Improvements in Devices for Handling and Setting Stone; and I hereby declare the same to be fully, clearly, and exactly described as follows, reference being had to the accompanying drawing, in which the device is illustrated in side elevation.

My invention has reference to apparatus for handling and setting blocks of stone in building, and is designed to supply a need long felt, and arising from the difficulty, with the means heretofore employed, of bringing the stones down evenly upon the mortar.

My said invention consists in a clamp constructed as hereinafter described, and adapted to securely grasp the block or slab of stone, while admitting of being readily and expeditiously removed when desired.

In the accompanying drawing, A A are the jaws of the clamp, having slots in their upper ends, through which passes a bar, $a$, perforated at intervals, as shown. Correspondingly-perforated lugs B are secured on the inside of the bars or jaws A, and are provided with pins $b$, for securing the bar $a$. The jaws A are perforated about their middle points, and through them pass the rods C C, pivoted together in the center and threaded, as shown, at their ends. Upon these ends are screwed the nuts $c$ $c$, having arms $c'$ $c'$.

D D are metallic washers that are mounted on the rods C C, and are curved on their inside faces, where they rest in correspondingly-shaped depressions in the sides of the jaws.

E is a rod slotted for the passage of the bar $a$, and pivoted to the junction of the rods C C. In its upper end is a ring or eye, to which the tackle is fastened by which the stone is lifted.

The perforations in the jaws A A are somewhat elongated, so as to admit of a limited motion on the part of the rods C C in the plane of the device.

In operation, the bar $a$ is secured in the lugs B, so that the upper ends of the jaws are separated about the thickness of the stone to be lifted. The jaws are then placed on either side of the stone, upon which they are clamped by means of the nuts $c$ $c$. Tackle being made fast to the end of the rod E, the stone is thereby lifted and lowered in place.

The weight of the stone causes the jaws A A to gripe it tightly, as the rods C C operate, in connection with the rod E, on the principle of the knee-joint.

As an alternative for the described construction, the rods C may pass in a right line through the jaws and be coupled to a knee-joint between them.

The rod E may, of course, in setting stones at an angle, as in arches, &c., be inclined and secured by a pin passing through the suitable hole in the bar $a$.

The jaws are slightly countersunk just below the knee-joint bars, in order to prevent chipping the upper edges of the stone.

What I claim is—

1. In a device for handling and setting stone, a pair of jaws adjustable as regards each other at their upper ends, and having an intermediate knee-joint connection, substantially as described.

2. In combination with the jaws A and perforated bar $a$, the rods C and E, substantially as described.

3. In combination with the jaws A, having perforated lugs B, the bar $a$, rods E and C, and nuts $c$, substantially as described.

E. J. LEYBURN.

Witnesses:
S. RAMSEY,
C. M. DOLD.